United States Patent [19]
D'Sa

[11] Patent Number: 5,235,984
[45] Date of Patent: Aug. 17, 1993

[54] ON-LINE ACOUSTIC DENSITOMETRY TOOL FOR USE WITH AN ULTRASONIC IMAGING SYSTEM

[75] Inventor: Alwyn P. D'Sa, Cambridge, Mass.

[73] Assignee: Hewlett-Packard Company, Palo Alto, Calif.

[21] Appl. No.: 860,683

[22] Filed: Mar. 30, 1992

[51] Int. Cl.$^5$ ............................................. A61B 8/00
[52] U.S. Cl. .................................. 128/660.07; 73/631
[58] Field of Search ...................... 128/660.01, 660.06, 128/660.07; 73/602, 631; 364/413.25

[56] References Cited
U.S. PATENT DOCUMENTS

| | | | |
|---|---|---|---|
| 4,852,577 | 8/1989 | Smith et al. | 128/660.07 |
| 4,881,549 | 11/1989 | Rhyne | 128/660.07 |
| 5,052,394 | 10/1991 | Carpenter et al. | 128/660.06 |
| 5,152,290 | 10/1992 | Freeland | 128/660.07 |

*Primary Examiner*—Francis Jaworski

[57] ABSTRACT

In an ultrasonic imaging system capable of generating conventional envelope detected acoustic data and/or integrated backscatter acoustic data, a mechanism is provided to select a plurality of pixels in a specified region of a two dimensional ultrasonic image. The pixel values are processed to compute the average acoustic intensity for the selected pixels. The average value is then processed to reverse any non-linearities between the calculated average value and the originally received acoustic signals which non-linearities may have been introduced by the compression, scaling and mapping of the data in order to display it on a conventional video monitor. The processed average acoustic intensity is plotted and the procedure repeated at specified time intervals to form a time-intensity curve whose characteristics are linearly related to the originally received acoustic signals. The characteristics of the time-intensity curve are calculated to provide further information about the irradiated body and the presence of any contrast agent therein.

30 Claims, 6 Drawing Sheets

ON-LINE ACOUSTIC DENSITOMETRY TOOL FOR USE WITH AN ULTRASONIC IMAGING SYSTEM

FIELD OF THE INVENTION

The present invention relates generally to ultrasonic imaging, and, more particularly to an apparatus for on-line quantitative measurement and display of the average acoustic signal, as a function of time, in a user specified region of a two dimensional ultrasonic image.

BACKGROUND OF THE INVENTION

Ultrasound generally refers to sound waves that have a frequency or pitch above the range of human hearing. In an ultrasonic imaging system, typically, short bursts of acoustic energy are directed into a body and the reflective energy or echoes are received at a later time. The amplitude of the reflective energy is processed and formatted into a video image of the insonified body. Ultrasonic imaging is used widely in medical applications to non-invasively "see" inside the human body, particularly the cardiac structures, the vascular system, the fetus, the uterus, the abdominal organs and the eye.

One application where ultrasonic imaging is particularly useful is echocardiography or imaging of the heart, particularly the myocardium. In echocardiography, ultrasound is used to image the myocardium and identify any irregularities in its structure. A known echocardiography technique is referred to as myocardial perfusion echocardiography. In this technique, a contrast agent is introduced into the coronary arteries. The dissipation or wash-out of the contrast agent from the myocardium is monitored with ultrasonic imagery. The rate at which the contrast agent dissipates from a region of the myocardium provides an indirect measurement of the blood flow or perfusion characteristics of that region of the myocardium. Such data is useful in determining whether or not a portion of the coronary arteries is blocked by a stenotic lesion. The technique is outlined in more detail in an article entitled "Myocardial Perfusion and Contrast Echocardiography: Review and New Perspectives", Vandenberg, *Echocardiography: A Journal of CV Ultrasound and Allied Technologies*, Vol. 8, No. 1, 1991.

One contrast agent which has been used successfully in myocardial perfusion techniques is microbubbles. Such microbubbles are approximately 4–7 microns in size, approximately the size of red blood cells, and are released as a bolus into one of the coronary arteries, typically through a percutaneously inserted angioplasty catheter. Since air pockets are highly reflective of ultrasonic energy, the presence of microbubbles within the myocardium causes a high reflection of acoustic energy resulting in a visually discernable area of brightness or intensity in the ultrasonic video image. The region of the myocardium with the greatest microbubble concentration appears as a region of high intensity on a grayscale ultrasonic image. This intensity decreases at a rate dependent upon the rate of perfusion through the myocardial tissue.

However, the relationship between microbubble concentration and the gray level intensity of the ultrasonic image is non-linear and dependent on the settings of the various imaging controls. Therefore, the video image is an inaccurate representation of the true myocardial perfusion characteristics. This non-linearity is due, in part, to the compression of the ultrasonic signals, which may have a dynamic range greater than 100 dB after amplification, to a smaller dynamic range, typically less than 20 dB, which is required so that the signals can be displayed on commercially available grayscale imaging equipment. In addition, preprocessing adjustments alter the relationship between the analog signal and the gray scale value of the image. Further, post-processing adjustments may vary the relationship between the digitized gray scale level and the displayed output gray levels in the imaging system.

In an attempt to overcome some of the above problems, systems have been developed in which the average intensity for the selected ultrasonic video data is corrected for background offset before the time-intensity curve of such data is plotted, as shown by the solid line in FIG. 1. Such a system is described in an article entitled "Workshop on Contrast Echocardiography: Myocardial Perfusion", Feinstein, *Echocardiography: A Journal of CV Ultrasound and Allied Technology*, Vol. 6, No. 4, 1989. The resulting time-intensity curve is then smoothed with a computer program, as shown by the dotted line in FIG. 1. However, the disclosed system has a number of drawbacks.

First, the process of extracting intensity data from stored video images and generating a time-intensity curve typically takes several hours and occurs "off-line" once the echocardiographic procedure, and any accompanying revascularization procedure has terminated. If the time-intensity plot is being used to determine tissue perfusion characteristics and, ultimately, the success of an angioplasty procedure, the results will not be available until the procedure has ended and the patient is no longer immediately available. Accordingly, a need exists for a way to acquire intensity data and generate a time-intensity plot in real-time while the echocardiography procedure is in progress and before any accompanying angioplasty or revascularization procedures have terminated.

Second, commercially available ultrasonic imaging systems offer various levels of both compression and postprocess gray scaling. Even careful analysis of stored video data cannot indicate what compression level and gray scale mapping were used when the video image was created. Compensation for the background intensity of the video image will not correct the non-linearities introduced into the video data by the compression and scaling of the ultrasonic signals. Also, smoothing of the time-intensity curve, as in the above-referenced article, will not compensate for such non-linearities.

Accordingly, a need exists for a way to reverse the non-linearities introduced by the compression or postprocess gray scaling of ultrasonic data so that an accurate time-intensity curve may be generated from a real-time or stored ultrasonic image, such curve having a direct linear relationship with the concentration of contrast agent in the selected region of the scanned tissue.

It is, therefore, an object of the present invention to provide a system in which the non-linearities introduced by compression and gray scaling of ultrasonic data into a video image may be reversed.

A further object of the present invention is to provide a system in which non-linearities caused by compression and gray scaling of ultrasonic data into video images may be reversed whether the video images are taken from a stored frame memory or real time buffer memory.

Yet another object of the present invention is to provide a system which can calculate the average intensity of a specified region of an ultrasonic video image in which the average intensity is linearly related to the received echo signals.

Still a further object of the present invention is to provide a system which can generate a time-intensity plot of ultrasonic data which accurately reflects the myocardial perfusion characteristics during a contrast echocardiography procedure.

A further object of the present invention is to provide a tool for quantitative measurement and display of the average acoustic signal in a user specified region of a two dimensional ultrasonic image.

BRIEF SUMMARY OF THE INVENTION

The above and other objects are achieved in accordance with the present invention which according to one embodiment, comprises a mechanism for retrieving image data elements from a selected contiguous region of a stored image signal. A data structure collectively associated with the stored image data elements indicates the type and level of processing to which the value of each data element was subjected during processing for visual display. After calculating an average value from the selected data values, a decompression is performed under selection by the associated data structure so that the resulting values represent the unprocessed intensity of the acoustic signal. The decompressed values are plotted on-screen in real-time as a time-intensity curve, which is further analyzed to provide diagnostic information on the insonified body during the actual test procedure.

More particularly, decompression is performed by applying the selected data values to a ROM look-up table. A microprocessor matches the previously-calculated average value of the selected points with an entry from the table and sets the average value to the associated unprocessed value. The decompressed equivalent to the average value, which now represents an unprocessed quantity linearly related to the originally received acoustic signal, is then plotted. The whole process is repeated to generate a time-intensity curve, which is further analyzed to provide diagnostic information on the insonified body.

The foregoing and other features, objects and advantages of the invention will be more fully understood by reading the detailed description below in conjunction with the drawings.

DETAILED DESCRIPTION OF A PREFERRED EMBODIMENT

The present invention provides an interactive tool for quantitative measurement, and display, of the average acoustic signal in a user-specified region of a two-dimensional ultrasonic image. The inventive system may be integrated with existing ultrasonic imaging systems, i.e. those which generate conventional envelope-detected acoustic data, or with systems that generate ultrasonic integrated backscatter data. In addition, the present invention can utilize both real-time and video memory data. The inventive system reverses any compression, processing or grayscale mapping to which the ultrasonic data was subjected and generates a time-intensity curve of an average acoustic signal, without the non-linearities introduced into the actual ultrasonic video image data. The system also provides means for calculating various characteristics of the time-intensity curve, as well as for color mapping of the ultrasonic image.

Figure 2:
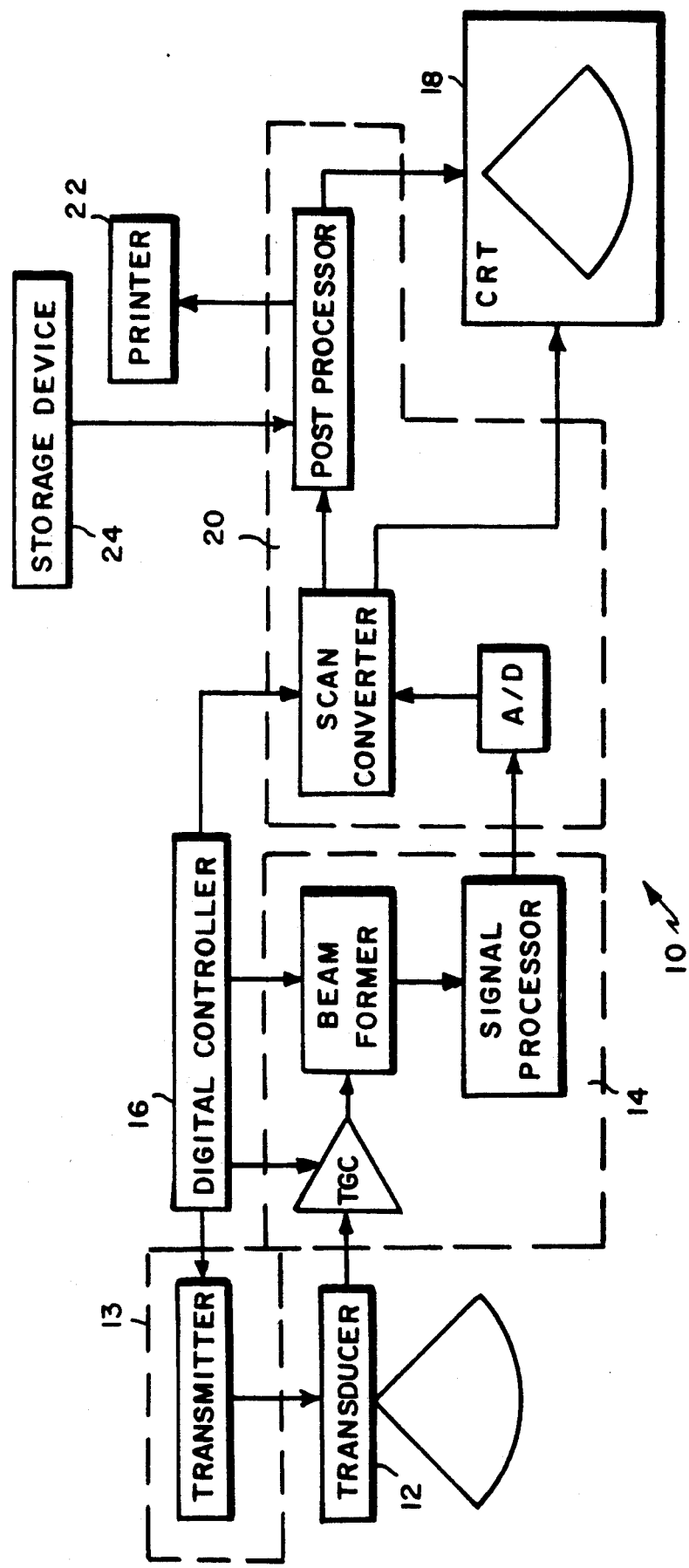
FIG. 2 is a block diagram of an ultrasonic imaging system suitable for use with the present invention.

With reference now to the drawings, and more particularly to FIG. 2 thereof, an ultrasonic imaging system 10 suitable for use with the present invention is illustrated. System 10 comprises an ultrasonic transducer 12, a scanner 14, a digital controller 16, a digital processing subsystem 20, a video display 18, an optional peripherals printer 22 and storage device 24. Imaging system 10 provides the hardware platform into which the present invention may be integrated with minor modification or additional hardware. Except for various modifications to the digital processing subsystem 20, as explained hereinafter, the structure and function of system 10 is known in the prior art. The interactive diagnostic tool of the present invention may be integrated into imaging system 10 completely with software for execution on existing hardware components or with a combination of software and additional memory elements, such as Read Only Memories (ROMs). Imaging systems suitable for use with the present invention are the HP SONOS 1000 Ultrasonic Imaging System or HP SONOS 1500 Ultrasonic Imaging System, both commercially available from Hewlett-Packard Company, Andover, Mass. 01810.

Quantitative Tool Format

The quantitative tool of the present invention may be configured to run as a child process under the operating system controlling the ultrasonic imaging system, both separate from or simultaneously with a currently executing imaging task. In this manner, the inventive tool may interact with the data, generated by the imaging task, at various points in the image processing chain without undesirably changing the ultrasonic image.

Typically, ultrasonic imaging system 10 will be operated from a command console associated with display element 18, such console comprising a plurality of dedicated controls and, possibly, an alphanumeric keyboard. Display element 18 is typically a special purpose CRT capable of displaying ultrasonic images as well as other diagnostic information and waveforms.

Figure 3A:
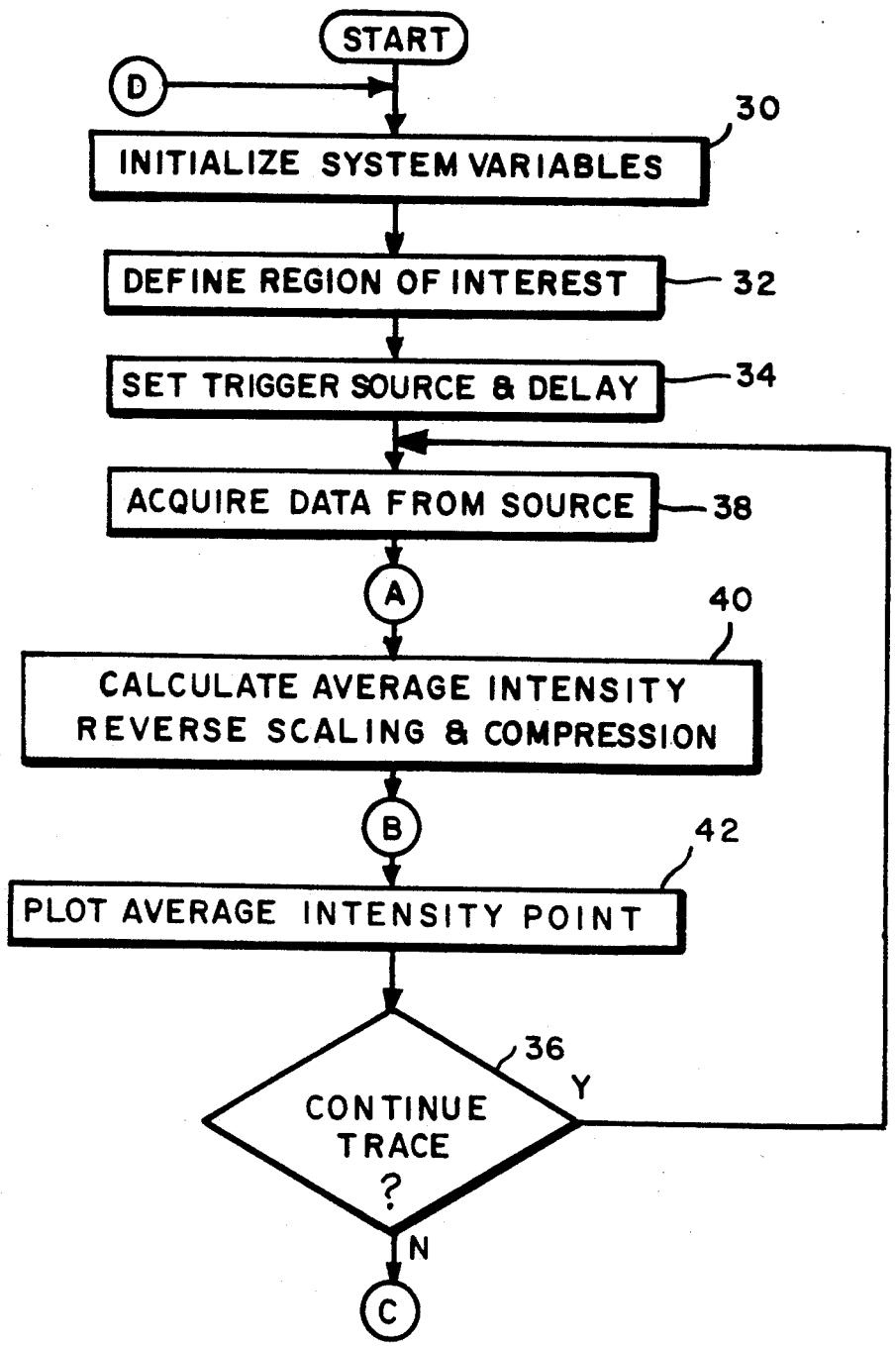
FIG. 3A-C is a flowchart of a method for generating a time-intensity curve in accordance with the present invention.
Figure 3B:
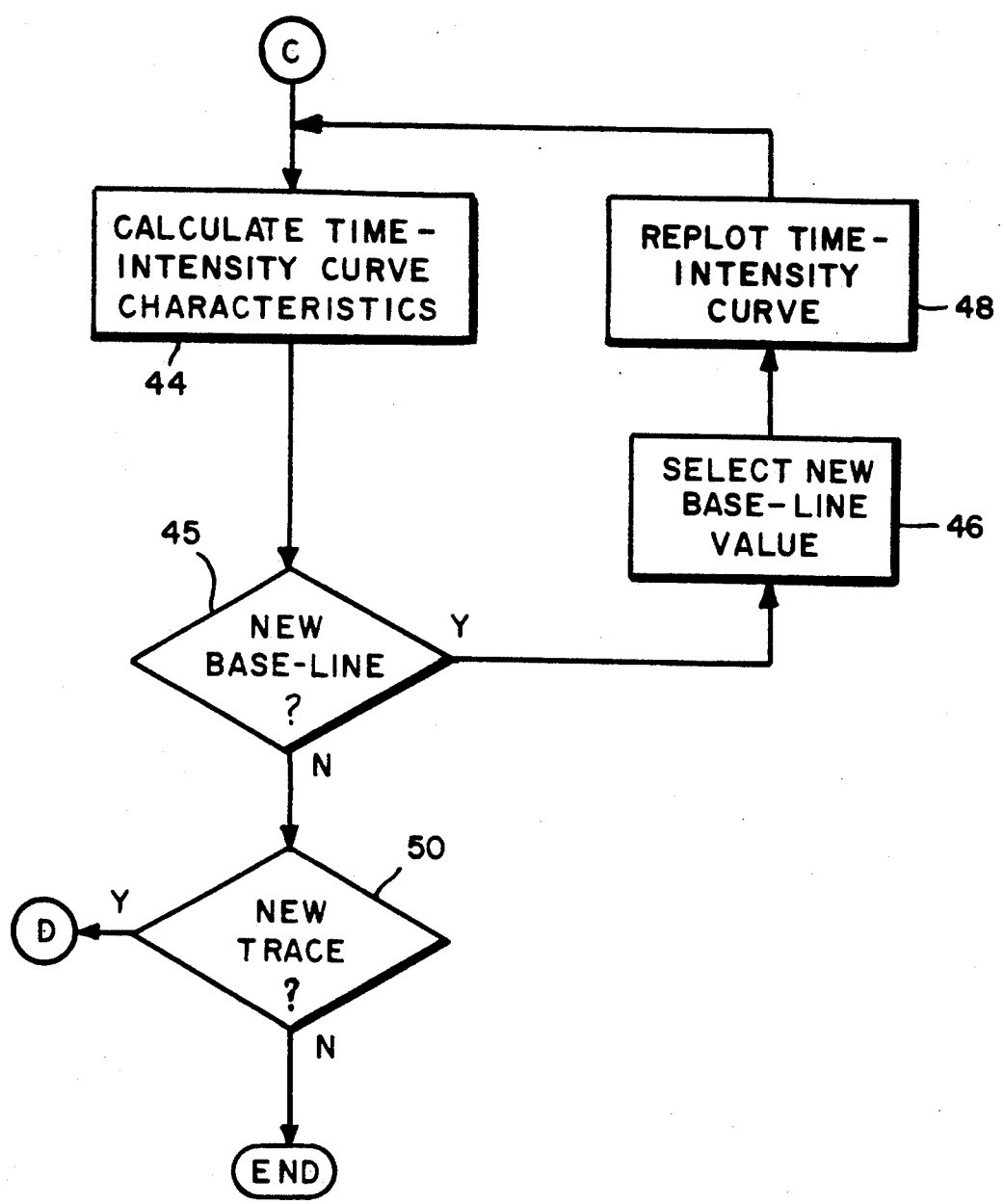

A flowchart of the algorithmic steps comprising the inventive diagnostic tool is illustrated in FIG. 3 which is comprised of FIGS. 3A and 3B that are to be placed together to form the complete figure. Once imaging system 10 is running, the operator will invoke execution of the inventive diagnostic tool and initialize all required parameters, as indicated by step 30 of FIG. 3.

The operator can invoke execution of the inventive tool by typing a command, selecting an on-screen menu option, or setting a dedicated control on the system command console. Once the interactive tool is invoked, a number of global program variables and data structures must be defined or initialized. For the purposes of illustration, a number of these variables will be given names and explained below.

The COMPRESSION variable represents one of a plurality of compression levels by which the originally received and amplified ultrasonic data is compressed into a dynamic range more suitable for display. The GRAYSCALE variable represents one of a plurality of levels at which the compressed ultrasonic data may be mapped or scaled for viewing on display element 18.

Each of the COMPRESSION and GRAYSCALE variables will typically be set automatically to the current system settings which are typically selected through hardwired controls on the system control panel. Each of these variables is typically represented with a binary field, the size of which will vary with the number of compression levels or the number of grayscale levels available in the system.

The DATATYPE variable indicates whether the data to be operated on by the inventive tool is conventional ultrasonic data or integrated backscatter data. It will be obvious to those reasonably skilled in the art that in an imaging system which is not capable of producing ultrasonic integrated backscatter data, this variable will always have the same value or may be eliminated in its entirety.

The SOURCE variable indicates whether the ultrasonic data is to be acquired from the real-time frame memory buffer in the system or from a video-loop memory. The video-loop memory is a multiple frame memory buffer and associated control system. The control system can acquire data sequentially in the frame memories and can display the stored data from each memory in sequence. The memories are arranged in a circular sequence so that the same display segment can be generated repeatedly from the stored data sequence. If the user specifies data is to be selected from the video loop memory, values for a starting video loop frame and ending video loop frame are typically further specified. Data is taken from successive frames in the video loop memory at specified intervals, as explained hereinafter.

In initializing the system, the user may further set up a small two-dimensional graphics plot or plane, typically in a corner of the CRT display and choose the scales for the x and y axes of the graphics plane. Also, the user may specify miscellaneous parameters, such as which system parameters should be displayed, as well as whether the processed data value should be numerically displayed as well as plotted. The user may further specify an annotation label or name for the particular time-intensity graph to be generated.

Having invoked and initialized the diagnostic tool, the user next selects the position, size and shape of a region of interest (ROI) from within an ultrasonic image, as indicated in step 32 of FIG. 3A. The region of interest is the area of the raster-scan ultrasonic video image from which the pixel data will be retrieved and manipulated. The region of interest may be positioned anywhere within the video image, typically by means of cursor keys, a trackball, mouse, etc ... to move a cursor displayed on the video screen over an area of the displayed image.

Once the user has selected the position of the region of interest, the coordinates defining the region of interest are stored in a data structure, referred to here as the ROIPOSITION variable. In the contemplated embodiment of the invention, the region of interest may be changed in real-time, thereby causing the value of the ROIPOSITION to be similarly updated.

The user next defines the values for the ROISIZE variable and ROISHAPE variables to define the size and shape of the region of interest, respectively. Typically, the shape of the ROI will be either rectangular or circular. The size will be typically specified by selecting one of a number of default sizes such as $11 \times 11$, $21 \times 21$, $31 \times 31$ or $41 \times 41$ pixels. The size of default circular region of interest may be similarly specified in terms of pixels per region diameter.

Next, having invoked the interactive tool, selected a source of data, and defined a region of interest, the user will specify a time interval at which data will be extracted from the specified data source, as indicated in step 34, FIG. 3A. The data acquisition can be triggered externally such as from the R-wave of an electrocardiogram, or from a source internal to the system, such as a timer. The TRIGGER variable represents the time interval between successive frames or trigger sources, as defined by the user. The value of the TRIGGER variable and the scale factors for the X-axis of the graphics plane will determine the density of the data in the time-intensity curve plotted by the inventive tool.

Next, the operator initiates the acquisition, processing, and plotting of the data within the specified region of interest, hereinafter referred to as a Trace operation. This operation and other selections made by the operator can be invoked or entered by depression of a dedicated switch within the control console of the system or by entering a command either at an alphanumeric keyboard or an on-screen menu. The switches, keyboard and menu are operated in a known manner on the conventional hardware.

The first step of the Trace operation is the retrieval of data from the specified source, as indicated in step 38 of FIG. 3A. Each pixel in the raster-scan ultrasonic image is defined in memory by a number of parameters including coordinate position and intensity value. The intensity values for every pixel within the region of interest, as defined by the ROIPOSTION, ROISIZE and ROISHAPE variable, are extracted from the source memory, as defined by the SOURCE variable, at the time interval, as defined by the TRIGGER variable. Under control of a digital processor, typically a microprocessor within the subsystem 20, an average intensity value for all pixels within the region of interest is computed and stored in an INTENSITY variable as indicated by step 40 in the flowchart of FIG. 3A. The value of the INTENSITY variable is further processed to compensate for any scaling, compression or mapping, depending on the value of the DATATYPE variable, as explained hereinafter.

Once the value of the INTENSITY variable has been processed to its final form, the value is plotted in the graphics plane previously defined by the user, as indicated in step 42 of FIG. 3A. Optionally, the numerical value of the INTENSITY variable may be displayed on the display element 18 for viewing along with the ultrasonic image The acquisition of data, computation of an intensity value, and plotting of that value, as indicated by steps 38, 40 and 42, respectively, will be repeated at the time interval specified by the TRIGGER variable and for the duration of the Trace operation, as indicated by decision step 36 and its accompanying loop in FIG. 3A. The duration of the Trace operation is dependent upon the procedure in progress.

Figure 1:
FIG. 1 is a time-intensity plot of the myocardial perfusion characteristics as generated by a prior art off-line echocardiography analysis system.
Figure 4:
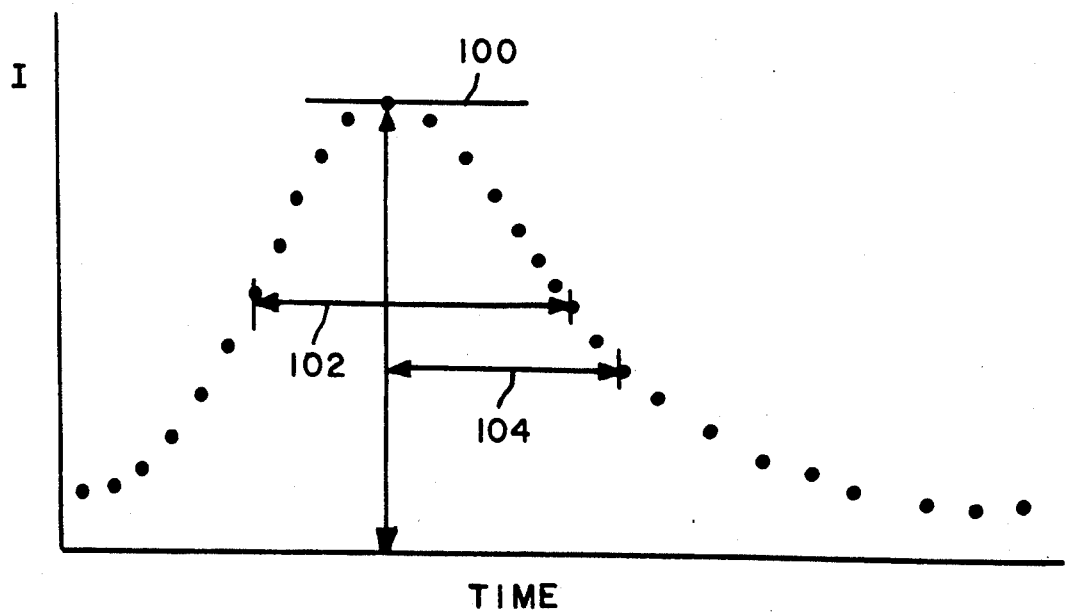
FIG. 4 is a time-intensity curve generated using a method according to the present invention.

The successive values of the INTENSITY value plotted during the Trace operation form a time-intensity curve, as shown in FIG. 4, which is for illustrative purposes only. This curve reflects the change in average intensity of the acoustic signal for a specified region, as would be characteristic in a contrast echocardiography procedure. If the intensity of the acoustic signal for the region of interest does not change throughout the Trace operation, the time-intensity plot would be a straight horizontal line. However, in applications such as contrast echocardiography, where a contrast agent present within the myocardium causes time varying changes in the intensity of the average acoustic signal, the resulting time-intensity plot is curved in shape. Because of the decompressing, de-scaling and reverse mapping procedures which occurred during the computation of the INTENSITY variable prior to its plotting, the resulting time-intensity curve is linearly related to the true myocardial perfusion characteristics.

As will be appreciated, because of the linearity of the generated time-intensity curve with the average acoustic signal, and hence, the presence of the contrast agent within the myocardium, the time-intensity curve provides information useful in accurately diagnosing myocardial perfusion characteristics, particularly the presence of an occlusion or stenotic lesion within the myocardium.

Next, certain key characteristics of the time-intensity curve are calculated using the actual values which form the curve. The calculation of these characteristics and the display of their numeric values on the screen are indicated by step 44 of FIG. 3B. These characteristics include the peak intensity of the curve, the area under the curve, the mean-transit time of the curve and the half time for the curve decay, the formulas and procedures used to generated these characteristics will be explained hereinafter.

Step 45 checks for the presence of a new "base-line" value. More particularly, in the time-intensity curve, the lowest value or values are referred to as the baseline value. The inventive tool provides means for recharacterizing the curve by allowing any of the points within the curve to be selected as the new base-line value. The BASELINE variable is automatically set to a default value, typically the lowest intensity point in the curve, and can be redefined by the user by merely selecting which of the numerically displayed values is to be the new baseline. This new value is compared to the previous value in step 45 and, if a new baseline is detected, the routine proceeds to step 46 of FIG. 3B.

Following the selection of a new baseline, the time-intensity curve will be replotted, with all of those intensity values having a value less than the value of the BASELINE variable being omitted from the graph. The replotting of the time-intensity curve is indicated by steps 46 in which the data below the new baseline is omitted and step 48 in which the curve is replotted. At this point, the routine returns to step 44 where the time-intensity curve characteristics of peak, area, etc . . . , will be recalculated for the new time-intensity curve.

If, at step 45, a comparison of the base-line values indicates that the base-line has not been changed, the user may exit the interactive tool or clear all variables, typically with a reset switch, and set up a new Trace operation in the same location of the myocardium or a different location of the myocardium, if desired, as indicated by decisional step 50 in FIG. 3B.

The actual processing of the intensity value which occurs in step 40 of FIG. 3 will now be explained in relation to the different hardware architectures used for conventional envelope-detected acoustic data and integrated backscattered data, for both real-time and video loop memories.

System Architecture and Linearization Process

Figure 5:
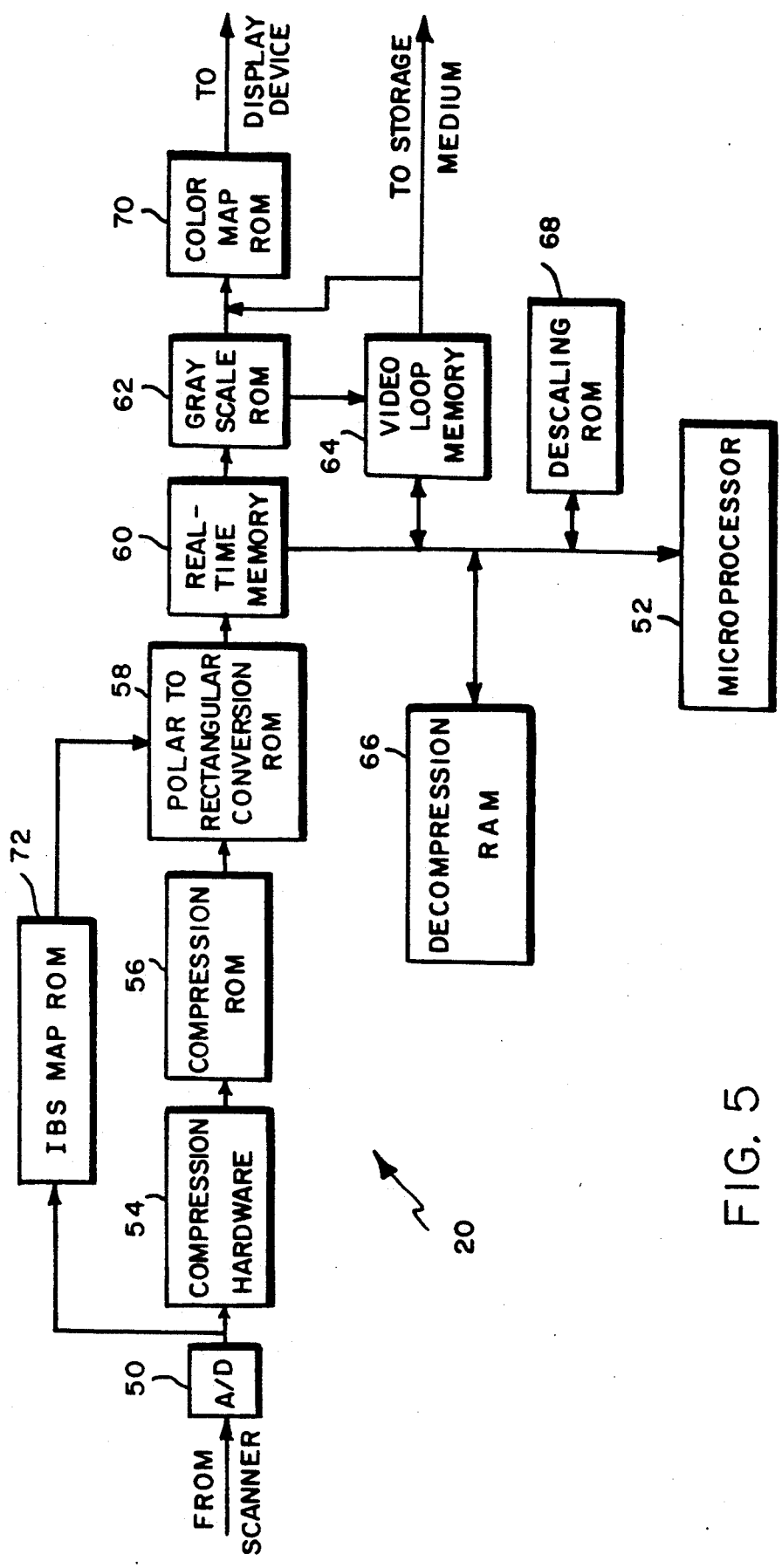
FIG. 5 is a block diagram of the digital processing subsystem of the ultrasonic imaging system of FIG. 2.

Referring to FIG. 5, there is illustrated a more detailed diagram of digital processing system 20 (FIG. 2) in an ultrasonic imaging system capable of generating conventional envelope-detected acoustic data as well as integrated backscatter (IBS) data. An imaging system capable of generating conventional ultrasonic data, as well as IBS data, and suitable for use with the invention is an HP SONOS 1500 Ultrasonic Imaging System, commercially available from Hewlett-Packard Company, 300 Minuteman Drive, Andover, Mass. 01810.

Generally, during operation, pulses of ultrasonic pressure waves are launched in sequence along a plurality of lines extending through a cross-sectional area to be imaged. Reflections of the pulses are received by a transducer for producing electrical signals which are then supplied to a digital processing subsystem, such as subsystem 20 of FIG. 5

Digital processing subsystem 20 comprises an analog-to-digital converter 50, compression processing hardware 54, a compression ROM 56, a polar-to-rectangular conversion ROM 58, a real-time memory buffer 60, a gray scale ROM 62, a video-loop memory buffer 64 and a color map ROM 70. Also associated with real-time memory buffer 60 are a microprocessor controller 52, a decompression RAM 66, and a descaling ROM 68, as well as the buses interconnecting these elements to each other and the rest of imaging system. For IBS data, a special IBS map ROM 72 is also provided in an alternative data path.

In a conventional envelope-detected ultrasonic system, imaging acoustic signals are received, amplified, processed and formed into a beam in scanner 14, the construction and function of such apparatus being well-known and within the scope of one skilled in the art. The ultrasonic data is then supplied to analog-to-digital (A/D) converter 50 of subsystem 20. The digital output of the A/D converter 50 is, in turn, supplied to compression hardware 54.

Depending on the compression algorithm used on the digitized ultrasonic data, the compression hardware will vary, as well as the need for compression ROM 56. Most ultrasonic imaging systems use complex logarithmic compression techniques, the actual implementation of which dictates the hardware configuration as well as the contents of the ROM 56. In general, ROM 56 is a look-up table memory containing a plurality of compression tables which are selected with the COMPRESSION variable. Such compression algorithms are beyond the scope of this description, but are conventional and known.

Following compression, the compressed ultrasonic data is supplied to ROM 58 which reformats the data from the polar coordinate system in which it is received from the scanner to a rectangular coordinate system which can be displayed on a video monitor. The digital word output of ROM 58 is supplied to a real-time buffer memory 60. Memory 60 stores the digital words for a complete frame of video information under control of microprocessor 52. Also under control of microprocessor 52, digital words are read out of memory 60 and applied to gray scale ROM 62 which is a look-up table memory containing a plurality of scaling tables which are selectable by the value of the GRAYSCALE variable as defined by the user. The output of ROM 62 is then supplied to color map ROM 70. ROM 70 is a look-up table memory containing a plurality of color map tables which are selectable by the value of a COLOMAP variable as defined by the user.

The output of ROM 70 is, in turn, supplied to the display device (not shown), such as a video monitor which displays the data as a conventional two-dimensional ultrasonic image. Alternately, the output of ROM 62, prior to its application to color map ROM 70, may be stored directly in video-loop memory 64, along with the corresponding values of the COMPRESSION and GRAYSCALE variables which are stored with the actual ultrasonic image data in a header-type format. In this manner, when ultrasonic image data is retrieved from video loop memory 64, the accompanying compression level and grayscale level data is also accessible and can be used for decompressing and de-scaling the image data, as explained hereinafter.

In integrated backscatter (IBS) ultrasonic imaging systems, a signal corresponding to the power of backscatter from a pulse of ultrasonic carrier waves traveling along a single path is derived using the apparatus and techniques described in U.S. Pat. No. 4,873,984, Hunt et al . . . , the disclosure of which is incorporated herein by reference in its entirety.

More particularly, the sampled, digital output of A/D converter 50 is applied to IBS mapping ROM 72 instead of the compression hardware 54. IBS mapping ROM 72 generates a signal which generates a value representing the mean back scatter value for each input sample. The output of IBS ROM 72 is, in turn, applied to ROM 58, which, as previously mentioned, reformats the data from the polar coordinate system to a rectangular coordinate system which may be displayed on a conventional display monitor (not shown in FIG. 5).

Advantageously, for IBS data, the output of grayscale ROM 62 may be supplied to video loop memory 64 along with the value of the GRAYSCALE variable. The GRAYSCALE variable value is stored in header format along with the IBS video image data to allow for de-scaling of the IBS data when it is retrieved from the video loop memory at a later time, and as explained hereinafter.

Figure 3C:
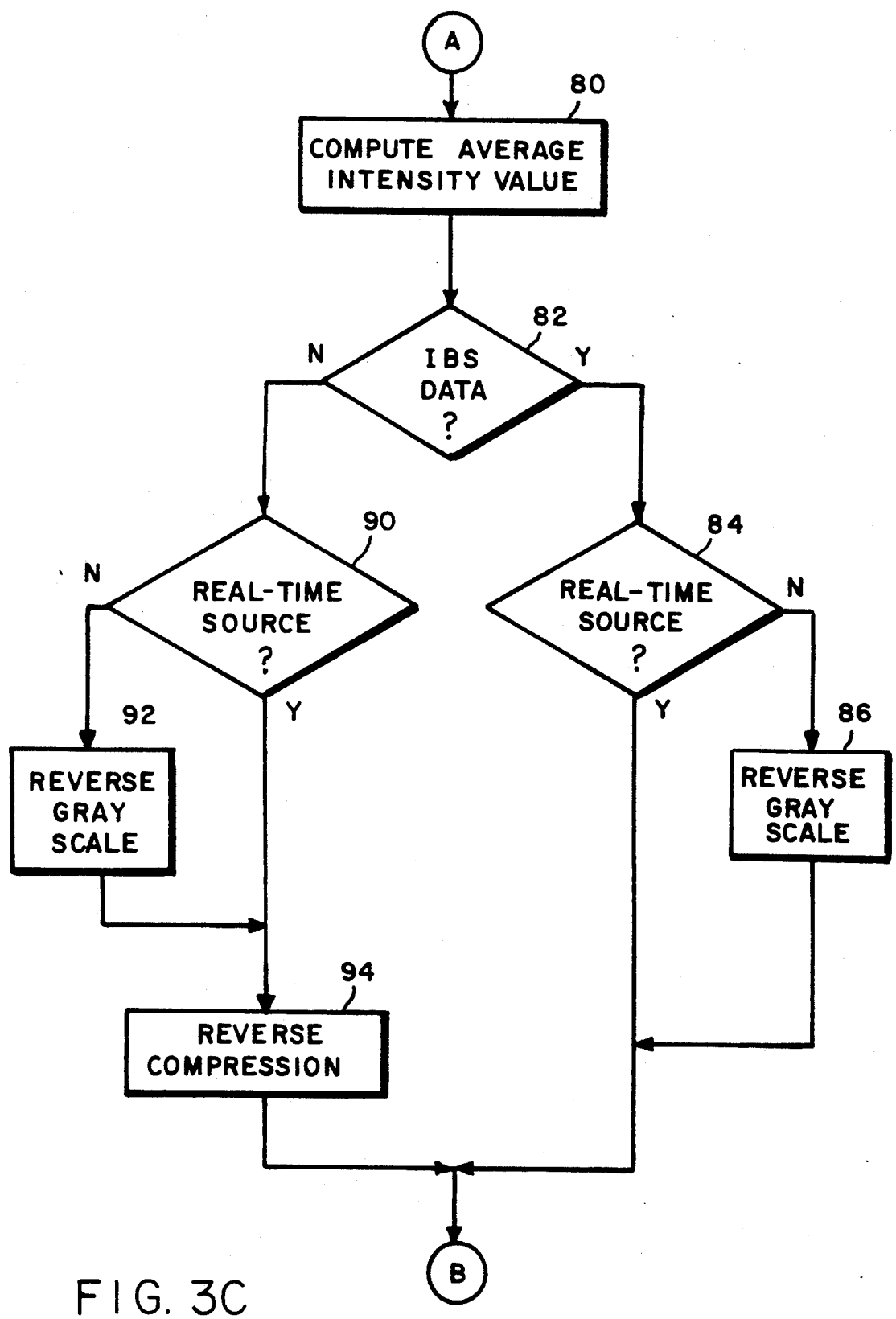

Referring to FIG. 3C, a more detailed flowchart of the procedural steps for linearizing ultrasonic data, as set forth in schematic form in step 40 of FIG. 3A, is illustrated. As explained previously, microprocessor 52 computes the average intensity of all pixels contained within the region of interest, as indicated by procedural step 80 of FIG. 3C. The resulting average intensity value is written into the INTENSITY variable.

Next, processor 52 determines whether the accessed data type is IBS data or conventional ultrasonic data from the value of the DATATYPE variable, as indicated in decisional step 82 of FIG. 3C. If the value of the DATATYPE variable indicates IBS data, the processor next determines whether the value of the SOURCE variable designates real-time memory buffer 60 or video loop memory 64, as indicated in decisional step 84 of FIG. 3C. If the data source is real-time memory buffer 60, no further processing of the average intensity, as indicated by the INTENSITY variable is necessary since the average intensity reflects the linear relationship of the integrated backscatter data received from the system scanner. If, however, the source of the IBS data is the video loop memory 64, the data has been grayscaled and further processing of the INTENSITY variable is required. In this event, the value of the GRAYSCALE variable is read from the header information for the specified video data frames in video loop memory 64. The value of the GRAYSCALE variable is used to access one of the plurality of grayscale tables within de-scale ROM 68. Microprocessor 52 then finds an entry in the selected table of ROM 68 which is equal in value to the INTENSITY variable in a manner similar to that described previously. The INTENSITY variable is then set equal to the associated unscaled INTENSITY variable of the matched entry as indicated in processing step 86 of FIG. 3C. The current value of intensity is then linearly related to the received IBS signal and requires no further processing. The INTENSITY value is then plotted.

In decisional step 82, if the DATATYPE variable indicates conventional ultrasonic data, a different linearization process occurs. Microprocessor 52 determines whether the value of the SOURCE variable indicates the data was taken from real-time memory buffer 60 or video loop memory 64, as indicated in decisional step 90 of FIG. 3C. If the data source is the video loop memory 64, the current value of the INTENSITY variable includes a grayscaling factor necessary to format the data for viewing. In this event, the value of the GRAYSCALE variable is read from the header information for the specified video data frames in video loop memory 64. The value of the GRAYSCALE variable is used to access one of the plurality of grayscale tables within de-scale ROM 68. Microprocessor 52 then finds an entry in the selected table of ROM 68 which is equal in value to the INTENSITY variable in a manner similar to that described previously. The INTENSITY variable is then set equal to the associated unscaled INTENSITY variable of the matched entry, as indicated in step 92 of FIG. 3C.

Next, the current value of the INTENSITY variable, whether the source of data is real-time buffer 60 or from the output of ROM 68, is supplied to decompression RAM 66 along with the value of the COMPRESSION variable. If the data is from real-time memory 60, the value of the COMPRESSION variable may be retrieved from the RAM memory associated with microprocessor 52. If the data source is video loop memory 64, the value of the COMPRESSION variable is retrieved from the header associated with the frame or frames from which the video information is retrieved. Decompression RAM 66 is a look-up table memory which contains a plurality of tables which are individually selectable by the value of the compression variable. Each table within the decompression ROM contains an entry and an associated decompressed intensity value which represents the value of the ultrasonic data prior to its compression, and, therefore, a more linear relationship with the acoustic signal received from the scanner. Microprocessor 52 finds the appropriate table entry for the current value of the INTENSITY variable and sets the INTENSITY variable to the associated uncompressed intensity, as indicated in procedural step 94 of FIG. 3C. The value of the INTENSITY variable now represents an intensity level which is linearly related to the acoustic data received from the system scanner.

As can be appreciated from the above explanations, the diagnostic tool of the present invention provides facilities for storing information relating to the levels of mapping, compression and grayscaling in an ultrasonic imaging system and utilizes this information to reverse the compression, scaling and mapping processes to obtain data which is linearly related to the acoustic signals received by the system transducer without the non-linearities introduced when processing the data for video format.

Time-Intensity Curve Characteristics

The procedures for calculating the time-intensity curve characteristics, as previously described with reference to process step 44 of FIG. 3B, are described in detail below. The time-intensity curve resulting from the Trace operation can be described by the Gamma-Variate Model of Equation 1 below.

$$Y = \beta t e^{-\alpha t} \quad \text{Eq. (1)}$$

In Equation 1, Y is the amplitude of the curve, beta is a constant scale factor, t is the time variable, e is the base of the natural logarithm, and alpha ($\alpha$) is the inverse time constant. Taking the derivative of Y with respect to time, results in Equation 2 below.

$$t_{max} = \frac{1}{\alpha} \quad \text{Eq. (2)}$$

In Equation 2, $t_{max}$ equals the time at which the peak of the time-intensity curve occurs. Substituting a value $t_{max}$ into Equation 2 and substituting Equation 2 into Equation 1 results in Equation 3 indicated below, from which the peak value of the time-intensity curve may be calculated. The peak value of the time-intensity curve is indicated in FIG. 4 as level 100.

$$P = \frac{\beta}{\alpha e} \quad \text{Eq. (3)}$$

Next, the area underneath the time-intensity curve is calculated using the method of integration by parts, the value of Y from zero to infinity which results in Equation 4 below, from which the area underneath the time-intensity curve may be calculated.

$$A = \frac{\beta}{\alpha^2} \quad \text{Eq. (4)}$$

The value of alpha ($\alpha$) may be expressed in terms of the peak and area, as indicated in Equation 5 below.

$$\alpha = e \frac{P}{A} \quad \text{Eq. (5)}$$

The mean transit time can be expressed in terms of $\alpha$ and calculated from Equation 6 below. The mean transit time is designated by interval 102 in FIG. 4.

$$TT = \frac{2.0}{\alpha} \quad \text{Eq. (6)}$$

The transit half-time can likewise be expressed in terms of $\alpha$, as indicated in Equation 7 below. The mean transit half-time is designated by interval 104 in FIG. 4.

$$T_{\frac{1}{2}} = \frac{1.677}{\alpha} \quad \text{Eq. (7)}$$

It may be appreciated from the above explanation that the diagnostic tool of the present invention not only allows for the generation of a time-intensity curve of the average acoustic intensity as a function of time for a specified region of a two dimensional ultrasonic image, but allows for analysis of the characteristics of the curve. Such characteristics being useful in further interpretation of the time-intensity curve data.

The set of points comprising the time-intensity curve can be supplied to a curve fitting subroutine so that intermediate data points may be interpolated between the original data set. In this manner, the curve may be indicated in a solid line to facilitate better visualization of the curve and its characteristics.

In the contemplated embodiment of the invention, multiple time-intensity curves may be displayed simultaneously as would result from sequential trace operations. This type of operation allows the operator to compare curves generated from different regions of interest.

According to another aspect of the invention, color map ROM 70 allows the user to manipulate the color of the ultrasonic video image based on the intensity values of the individual pixels. In a typical grayscale display, the red, green and blue values of each pixel are set equal. However, by offsetting the intensity of one or more colors, as the intensity of the pixel value changes, colors may be achieved which change as the intensity of pixels change. Such a device is useful in determining intensity changes over the shaded grayscale in conventional ultrasonic imaging. Color map 70 contains a plurality of color maps in the form of a look-up table memory. The individual color maps may be accessed by the value of the color variable as specified by the user. Any change in color that occurs to the ultrasonic video data is utilized only by display element 18 and does not result in any scaling or non-linearities introduced into the image data. Accordingly, no process or procedure is required to reverse the effects of color mapping as it will not be present in either the video data stored in video loop memory 64 or in the data present in real-time buffer 60.

It may be appreciated from the above disclosure that the methods and apparatus of the present invention provide a tool for quantitative measurement and display of the average acoustic signal in a specified region of a two dimensional ultrasonic image, such tool capable of operating on conventional ultrasonic data or integrated backscatter ultrasonic data from either real-time memories or from video-loop memory.

Accordingly, it will be appreciated that the detailed disclosure has been presented by way of example only is not intended to be limiting. Various alterations, modifications and improvements will readily occur to those skilled in the art, and may be appreciated without departing from the spirit and scope of the invention. For example, although one application of the invention is for use in echocardiography, it is not limited to such applications and may be used with any ultrasonic imaging application. Further, the system variables, described herein, need not be stored and processed directly in the digital processing subsystem 20 but may be stored in other memories within the imaging system 10 (such as an optical disk, etc . . .) and may also be processed by digital controller 16 as well as processor 52. Further, it will also likewise be obvious to those skilled in the art that in an imaging system which is capable of generating only one of integrated backscatter data or conventional ultrasonic data, the variables and steps necessary to determine the datatype may be eliminated, as only one or the other is required. The invention is limited only as required by the following claims and equivalence thereto:

I claim:

1. An apparatus for quantitative measurement of the average acoustic signal in a region of an ultrasonic image comprising:
    a source of image data elements, each of the data elements comprising a value representing the intensity of an acoustic signal;
    a data structure collectively associated with the image data elements, the data structure indicating a type and level of processing to which the intensity value of each data element was subjected;
    means for calculating an average intensity value from the intensity values selected of the image data elements;
    a memory table, selectable by the data structure, each entry of the table associated with an unprocessed intensity value;
    means for matching the average intensity value with an entry of the selected table and for setting the average intensity value equal to the unprocessed intensity value associated with the matched entry; and
    means for displaying the average intensity value.

2. The apparatus of claim 1 wherein said data structure indicates whether gray-scale processing of the image data elements has occurred and by which of a plurality of gray-scale levels the processing of the image data elements has occurred.

3. The apparatus of claim 2 wherein said memory table is a look-up memory table and wherein the unprocessed intensity value associated with each table entry comprises a value representing an acoustic signal intensity which has not been subject to gray-scale processing.

4. The apparatus of claim 1 wherein said data structure indicates whether compression processing of the image data elements has occurred and by which of a plurality of compression levels the processing of the image data elements has occurred.

5. The apparatus of claim 4 wherein said memory table is a look-up memory table and wherein the unprocessed intensity value associated with each table entry comprises a value representing an acoustic signal intensity which has not been subject to compression processing.

6. The apparatus of claim 1 further comprising:
    a second data structure collectively associated with the image data elements, said second data structure indicating a type and level of a second processing to which the intensity value of each data element was subjected; and
    a second memory table, selectable by the second data structure, each entry of the second table associated with an intensity value which has not been subjected to the second process.

7. The apparatus of claim 1 wherein the source of image data elements comprises a real-time memory buffer.

8. The apparatus of claim 7 wherein each of the image data elements comprises a picture element having an intensity value representing the intensity of an envelope-detected acoustic signal.

9. The apparatus of claim 7 wherein each of the image data elements comprises a picture element having an intensity value representing the intensity of an integrated backscatter acoustic signal.

10. The apparatus of claim 1 wherein the source of image data elements comprises a video loop memory.

11. The apparatus of claim 10 wherein each of the image data elements comprises a picture element having an intensity value representing the intensity of an envelope-detected acoustic signal.

12. The apparatus of claim 10 wherein each of the image data elements comprises a picture element having an intensity value representing the intensity of an integrated backscatter acoustic signal.

13. The apparatus of claim 1 wherein said means for displaying the average intensity value comprises a cathode ray tube display.

14. The apparatus of claim 1 further comprising means for generating a time-intensity curve from a plurality of displayed average intensity values.

15. The apparatus of claim 14 further comprising means for calculating the peak intensity of the generated time-intensity curve and the area underneath the time-intensity curve.

16. The apparatus of claim 14 further comprising means for calculating the mean transit time of the time-intensity curve and the mean transit half-time of the time-intensity curve.

17. In an ultrasonic imaging system for generating digitized data representing the intensity of an acoustic signal and for video processing the digitized data into ultrasonic video images, an acoustic densitometry apparatus for quantitatively measuring the average intensity of the acoustic signal in a region of an ultrasonic video image, comprising:
    memory means for storing said digitized data and data structure indicating the type and level of video processing to which the digitized data has been subject;
    a processor, couple to the memory means, for calculating an average acoustic intensity value for a selected portion of said digitized data at a predetermined time intervals;
    means, coupled to said processor and said memory means, for reverse processing the average acoustic intensity values calculated by the processor in accordance with the type and level of video processing indicated by said data structure; and
    a display for plotting said reverse processed average intensity values to generate a time-intensity curve.

18. The acoustic densitometry apparatus of claim 17 wherein said means for reverse processing comprises a first memory look-up table, selectable by said data structure, each entry of the memory look-up table associated with an intensity value; and
    means for matching the average acoustic intensity values calculated by said processor with an entry of the first memory look-up table and for setting said average acoustic intensity values equal to the intensity value associated with the matched entry.

19. The acoustic densitometry apparatus of claim 18 wherein said means for reverse processing further comprises a second memory look-up table, selectable by said data structure, each entry of the second memory look-up table associated with an intensity value; and means for matching the intensity values from the first memory table with an entry of the second memory look-up table and for setting said intensity values equal to the unprocessed intensity value associated with each entry of the second memory look-up table.

20. The acoustic densitometry apparatus of claim 17 wherein said memory means comprises a real-time memory buffer.

21. The acoustic densitometry apparatus of claim 17 wherein said memory means comprises a video loop memory.

22. The acoustic densitometry apparatus of claim 17 further comprising means for calculating the mean transit time of the time-intensity curve and the mean transit half-time of the time-intensity curve.

23. The acoustic densitometry apparatus of claim 17 further comprising means for calculating the peak intensity of the time-intensity curve and the area under the time-intensity curve.

24. A method for quantitatively measuring the average acoustic signal in a region of an ultrasonic image comprising the steps of:

a. providing a source of image data elements;
b. selecting a plurality of said image data elements representing a region of the ultrasonic image;
c. specifying time intervals at which the average acoustic intensity of the selected image data elements is to be calculated over a period of time;
d. calculating an average acoustic intensity value from the selected image data elements;
e. determining whether the image data elements have been previously processed into a video format;
f. reverse processing the calculated average acoustic intensity value to eliminate any video processing if necessary;
g. plotting the average intensity value; and
h. repeating steps d through f to generate a time-intensity curve.

25. The method of claim 24 further comprising the step of:

calculating the peak intensity value of the time-intensity curve generated in step (h).

26. The method of claim 24 further comprising the step of calculating the area underneath the time-intensity curve generated in step (h).

27. The method of claim 24 further comprising the step of calculating the mean transit time of the time-intensity curve generated in step (h).

28. The method of claim 24 further comprising the step of calculating the mean transit half-time of the time-intensity curve generated in step (h).

29. The method of claim 24 wherein step (f) comprises matching the calculated average intensity value with an entry of a first memory look-up table and setting the calculated average intensity value equal to an output intensity value associated with the matched entry.

30. The method of claim 29 wherein step (f) further comprises matching the output intensity value with an entry of a second memory look-up table and setting the output intensity value equal to a second output intensity value associated with the matched entry of the second memory look-up table.

* * * * *